(12) United States Patent
Okanobu

(10) Patent No.: US 7,505,746 B2
(45) Date of Patent: Mar. 17, 2009

(54) IC RECEIVER TO MINIMIZE TRACKING ERROR

(75) Inventor: Taiwa Okanobu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/472,262

(22) Filed: Jun. 21, 2006

(65) Prior Publication Data

US 2007/0004371 A1    Jan. 4, 2007

Related U.S. Application Data

(63) Continuation of application No. 10/344,229, filed as application No. PCT/JP02/05508 on Jun. 4, 2002, now Pat. No. 7,164,895.

(30) Foreign Application Priority Data

Jun. 8, 2001    (JP)    ............................. 2001-174197

(51) Int. Cl.
   H04B 1/44    (2006.01)
   H04B 1/18    (2006.01)
   H04B 1/10    (2006.01)
   H04B 15/06   (2006.01)

(52) U.S. Cl. .................. 455/193.1; 455/83; 455/150.1; 455/317

(58) Field of Classification Search ................. 455/317, 455/318, 319, 150.1, 154.1, 161.2, 165.1, 455/168.1, 180.3, 182.3, 183.1, 183.2, 193.1, 455/83, 84, 85
See application file for complete search history.

(56) References Cited

U.S. PATENT DOCUMENTS

| | | | | |
|---|---|---|---|---|
| 4,395,777 A | | 7/1983 | Oki et al. | |
| 4,709,406 A | * | 11/1987 | Omoto | 455/208 |
| 5,179,729 A | * | 1/1993 | Mishima et al. | 455/260 |
| 5,301,206 A | * | 4/1994 | Ishigaki et al. | 375/141 |
| 5,552,838 A | | 9/1996 | Suizu | |
| 5,606,736 A | * | 2/1997 | Hasler et al. | 455/314 |
| 5,610,559 A | * | 3/1997 | Dent | 331/2 |

(Continued)

FOREIGN PATENT DOCUMENTS

JP    05-252072 A    9/1993

(Continued)

*Primary Examiner*—Nay A Maung
*Assistant Examiner*—Andrew Wendell
(74) *Attorney, Agent, or Firm*—Wolf, Greenfield & Sacks, P.C.

(57) ABSTRACT

A multi-band receiver in which characteristics including a tracking error are improved is provided with a variable frequency oscillator circuit, a variable divider circuit (39) for dividing an oscillation signal (SVCO) of the variable frequency oscillator circuit, and mixer circuits (15I) and (15Q) for subjecting a received signal SRX to frequency conversion into an intermediate frequency signal (SIF) by a local oscillation signal (SLO). A divided output of the variable divider circuit (39) is supplied as the local oscillation signal (SLO) to each of the mixer circuits (15I) and (15Q). When a signal in a first frequency band is received, the division ratio n of the variable divider circuit (39) and the oscillation frequency of the variable frequency oscillator are changed to change the reception frequency in the first frequency band. When a signal in a second frequency band is received, at least the oscillation frequency of the variable frequency oscillator circuit is changed to change the reception frequency in the second frequency band.

4 Claims, 17 Drawing Sheets

U.S. PATENT DOCUMENTS

| | | | |
|---|---|---|---|
| 5,712,595 A * | 1/1998 | Yokoyama | 331/2 |
| 5,909,644 A | 6/1999 | Tomiyama | |
| 6,002,926 A * | 12/1999 | Shiraishi | 455/314 |
| 6,073,000 A | 6/2000 | Shinohara | |
| 7,013,120 B2 * | 3/2006 | Gilmore | 455/285 |
| 7,194,044 B2 * | 3/2007 | Birkett et al. | 375/324 |
| 2002/0039894 A1 * | 4/2002 | Yoshida et al. | 455/265 |
| 2004/0043727 A1 * | 3/2004 | Sato | 455/102 |

FOREIGN PATENT DOCUMENTS

| | | |
|---|---|---|
| JP | 05-268583 | 10/1993 |
| JP | 09-172385 A | 6/1997 |
| JP | 2000-165277 A | 6/2000 |
| JP | 2001-186039 A | 7/2001 |
| JP | 2002-118795 A | 4/2002 |

* cited by examiner

FIG. 3

| | RECEPTION FREQUENCY f RE [kHz] | FREQUENCY STEP [kHz] | N | STEP OF N | OSCILLATION FREQUENCY f VCO [MHz] | n | LOCAL OSCILLATION FREQUENCY f LO [kHz] | ERROR OF f LO [Hz] |
|---|---|---|---|---|---|---|---|---|
| LONG WAVE | 150 | 9 | 9225 | — | 36.900 | 180 | 205.000 | 0 |
| | 153 | } 9-kHz STEP | 9360 | — | 37.440 | 180 | 208.000 | 0 |
| | 162 | | 9873 | — | 39.492 | 182 | 216.989 | −11.0 |
| | ... | | ... | | ... | ... | ... | ... |
| | 513 | | 29394 | — | 117.576 | 207 | 568.000 | 0 |
| | 520 | | 29756 | — | 119.024 | 207 | 574.995 | −4.9 |
| MEDIUM WAVE | 522~1800 | 9 | 9232~29680 | 144 | 36.928~118.720 | 64 | 577~1855 | 0 |
| SHORT WAVE 1 | 1800~3750 | 1 | 14840~30440 | 8 | 59.360~121.760 | 32 | 1855~3805 | 0 |
| SHORT WAVE 2 | 3600~7500 | 1 | 14620~30220 | 4 | 58.480~120.880 | 16 | 3655~7555 | 0 |
| SHORT WAVE 3 | 7200~15000 | 1 | 14510~30110 | 2 | 58.040~120.440 | 8 | 7255~15055 | 0 |
| SHORT WAVE 4 | 14400~30000 | 1 | 14455~30055 | 1 | 57.820~120.220 | 4 | 14455~30055 | 0 |
| FM | 76~108 [MHz] | 50 | 1524~2164 | 1 | 304.8~432.8 | (4) | 76.2~108.2 [MHz] | 0 |

FIG. 11

| | RECEPTION FREQUENCY fRE [kHz] | FREQUENCY STEP [kHz] | N | STEP OF N | OSCILLATION FREQUENCY fVCO [MHz] | n | LOCAL OSCILLATION FREQUENCY fLO [kHz] | ERROR OF fLO [Hz] |
|---|---|---|---|---|---|---|---|---|
| LONG WAVE | 150 | 9-kHz STEP | 14248 | — | 227.968 | 1112 | 205.0072 | +7.2 |
| | 153 | | 14352 | — | 229.632 | 1104 | 208.0000 | 0 |
| | 162 | | 14702 | — | 235.232 | 1084 | 217.0037 | +3.7 |
| | ... | | ... | | ... | ... | ... | ... |
| | 513 | | 30814 | — | 493.024 | 868 | 568.0000 | 0 |
| | 520 | | 31050 | — | 496.800 | 864 | 575.0000 | 0 |
| MEDIUM WAVE | 522 | 9-kHz STEP | 14281 | — | 228.496 | 396 | 577.0101 | +10.1 |
| | 531 | | 14357 | — | 229.712 | 392 | 586.0000 | 0 |
| | ... | | ... | | ... | ... | ... | ... |
| | 1782 | | 30770 | — | 492.320 | 268 | 1837.0149 | +14.9 |
| | 1791 | | 30921 | — | 494.736 | 268 | 1846.0299 | +29.9 |
| | 1800 | | 31071 | — | 497.136 | 268 | 1854.9851 | −14.9 |
| SHORT WAVE 1 | 1800~3750 | 1 | 14840~30440 | 8 | 237.440~487.040 | 128 | 1855~3805 | 0 |
| SHORT WAVE 2 | 3600~7500 | 1 | 14620~30220 | 4 | 233.920~483.520 | 64 | 3655~7555 | 0 |
| SHORT WAVE 3 | 7200~15000 | 1 | 14510~30110 | 2 | 232.160~481.760 | 32 | 7255~15055 | 0 |
| SHORT WAVE 4 | 14400~30000 | 1 | 14455~30055 | 1 | 231.280~480.880 | 16 | 14455~30055 | 0 |
| FM | 76~108 [MHz] | 50 | 7620~10820 | 1 | 304.8~432.8 | 4 | 76.2~108.2 [MHz] | 0 |

IC RECEIVER TO MINIMIZE TRACKING ERROR

CROSS REFERENCE TO RELATED APPLICATIONS

This application is a continuation of application Ser. No. 10/344,229 filed on Jun. 9, 2003, entitled "IC RECEIVER TO MINIMIZE TRACKING ERROR" which, in turn, claims priority under 35 U.S.C. 371 and 37 CFR 1.495 to PCT/JP02/05508, filed Jun. 4, 2002, which, in turn, claims priority to Japanese application No. JP2001-174197 filed Jun. 8, 2001.

TECHNICAL FIELD

The present invention relates to a receiver and an IC.

BACKGROUND ART

A typical double-conversion superheterodyne receiver has a configuration shown in FIG. 17. Specifically, a signal received by an antenna 61 is supplied to an antenna tuned circuit 201 to obtain a target reception frequency fRX which is then supplied to a first mixer circuit 203 via a high-frequency amplifier 202. The received signal is subjected to frequency-conversion by the first mixer circuit 203 into a first intermediate frequency fIF1 by a first local oscillation signal supplied from a first local oscillator circuit 205. The received signal is further supplied to a second mixer circuit 206 via a first intermediate-frequency amplifier 204. The signal is subjected to frequency-conversion by the second mixer circuit 206 into a second intermediate frequency fIF2 by a second local oscillation signal supplied from a second local oscillator circuit 208. For example, when the first intermediate frequency fIF1 is 58 MHz and the second intermediate frequency fIF2 is 450 kHz, the reception bandwidth can range from 150 kHz to 30 MHz if the first local oscillation frequency fLO1 changes in a range between 58.6 MHz and 88.45 MHz. The signal is further supplied to a second intermediate frequency amplifier 207 and then to a detector 209.

In superheterodyne receivers, provided that:

fRX: reception frequency (desired frequency at which a signal is received)

fLO: local oscillation frequency fIF: intermediate frequency, then, $$fRX=fLO-fIF \quad (1)$$

or $$fRX=fLO+fIF \quad (2)$$

The reception frequency fRX is defined by the local oscillation frequency fLO.

Thus, the tuning frequency fTN of an antenna tuned circuit must be deviated accurately by the intermediate frequency fIF from the local oscillation frequency fLO. If the tuning frequency fTN contains an error, the level of the received signal of the frequency fRX is low, thereby reducing the reception sensitivity. The error between the local oscillation frequency fLO and the tuning frequency fTN is called "tracking error".

In the receiver shown in FIG. 17, practically, a ferrite bar antenna is used to cover the long-wave band (150 kHz to 520 kHz) and the medium-wave band (522 kHz to 1800 kHz), while an external antenna is used to cover the short-wave band (1.8 MHz to 30 MHz). Therefore, an antenna tuned circuit for use in the long- and medium-wave bands, and an antenna tuned circuit for use in the short-wave band are separately required.

Even when an antenna tuned circuit for use in the short-wave band is provided, however, as discussed above, the short-wave band is as broad as 1.8 MHz to 30 MHz, and the tracking error should also be considered. In a practical receiver, thus, an antenna tuned circuit for use in the short-wave band is implemented as a band-pass filter which uses as pass bands frequency bands into which the short-wave band is divided. The antenna tuned circuit for use in the short-wave band is therefore an uninterlocked circuit.

If the antenna tuned circuit is an uninterlocked circuit, however, both the target frequency and the remaining frequencies are supplied to the following stages, resulting in an unsatisfactory interference characteristic. Furthermore, the following high-frequency amplifier must be formed of a special low-noise junction FET for the purpose of noise reduction, which cannot be incorporated together with the other circuits into an IC, thus preventing simplification in assembly or packaging.

Since the first local oscillation frequency in the short-wave band is as high as 60.25 MHz to 88.45 MHz, if a synthesizer receiver is used in which a first local oscillator circuit is formed of a VCO in a PLL, low phase noise cannot be achieved in the first local oscillation signal. In particular, if a frequency step in the reception frequency band is set small, the PLL does not have a wide loop bandwidth, and it is more difficult to improve the characteristic.

Meanwhile, in the antenna tuned circuit for use in the long- and medium-wave bands, if a padding capacitor (a capacitor for frequency adjustment) is adjusted so as to minimize the tracking error in the medium-wave band, the tracking error increases in the long-wave band. Conversely, if the padding capacitor is adjusted so as to minimize the tracking error in the long-wave band, the tracking error increases in the medium-wave band.

Therefore, due to the tracking error, the reception sensitivity is reduced in the long or the medium-wave band. If the antenna tuned circuit for use in the long- and medium-wave bands is an uninterlocked circuit in order to avoid such a reduction of the reception sensitivity, the above-described problems occur.

Another conceivable receiver includes an antenna tuned circuit for use in the long- and medium-wave bands, and a non-volatile memory having antenna tuning data stored therein, such that portion of the data which corresponds to the reception frequency is subjected to D/A conversion and the result is supplied to the antenna tuned circuit. Such a receiver allows the tuning frequency fTN of the antenna tuned circuit to be controlled with accuracy to the reception frequency fRX defined by the local oscillation frequency fLO, resulting in no tracking error.

In this case, however, it is necessary to adjust the tuning frequency fTN for each receiver and to store the resultant data in the non-volatile memory, which wastes much time and labor, leading to increasing cost.

The present invention is intended to overcome the foregoing problems.

DISCLOSURE OF INVENTION

According to the present invention, a receiver which is of the superheterodyne type which uses at least a first frequency band and a second frequency band as reception bands includes:

a variable frequency oscillator circuit;

a variable divider circuit for dividing an oscillation signal of the variable frequency oscillator circuit which is supplied thereto; and a mixer circuit for subjecting the received signal to frequency conversion into an intermediate frequency signal by a local oscillation signal, wherein a divided output of the variable divider circuit is supplied as the local oscillation signal to the mixer circuit, the division ratio n of the variable divider circuit changes depending upon when a signal in the first frequency band is received and when a signal in the second frequency band is received, and the oscillation frequency of the variable frequency oscillator circuit changes, thereby changing the reception frequency in each of the first frequency band and the second frequency band.

Therefore, without use of a padding capacitor to adjust the tracking error, an antenna tuning voltage can be changed by selecting the division ratio n to adjust the tracking error.

BRIEF DESCRIPTION OF THE DRAWINGS

FIG. 3 is a table showing one form of the correspondence of frequencies.

FIG. 11 is a table showing another form of the correspondence of frequencies.

BEST MODE FOR CARRYING OUT THE INVENTION

① First Receiver

1. Configuration and Operation of the Receiver

Figure 1:
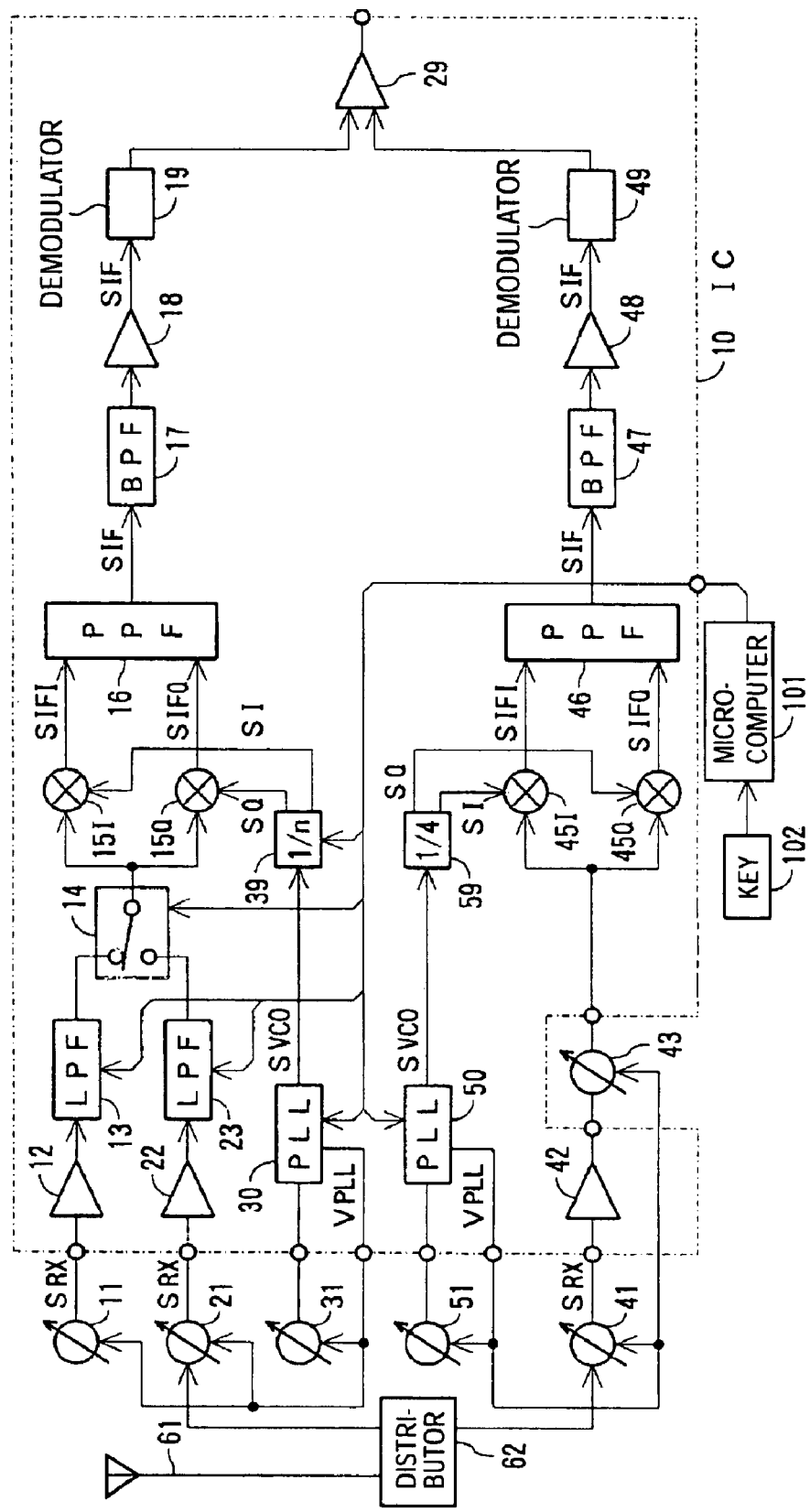
FIG. 1 is a schematic diagram showing one embodiment of the present invention.

FIG. 1 shows an example in which the present invention is applied to a multi-band receiver for receiving long-, medium-, and short-wave band signals, and an FM broadcast band signal. In this example, the short-wave band is divided into four frequency sub-bands. In this example, the range and frequency step of the reception frequency bands at the long-, medium-, and short-wave bands and the FM broadcast band are shown in FIG. 3.

Although the relationship between the reception frequency and the local oscillation frequency, etc., is summarized later, the intermediate frequency for reception of long-, medium-, and short-wave band signals is 55 kHz, and the intermediate frequency for reception of FM broadcast band signals is 200 kHz.

In FIG. 1, a section 10 surrounded by a chained line indicates a monolithic IC of one chip. A microcomputer 101 serving as a system control circuit is connected to the IC 10, and an operation key (operation switch) 102 is connected as a user interface to the microcomputer 101. The IC 10 is controlled by the microcomputer 101 according to operation using the operation key 102.

Specifically, a long- and medium-wave band antenna tuned circuit 11 is an electronically tuned circuit formed of a bar antenna coil (ferrite bar antenna) and a variable capacitance diode for obtaining a received signal SRX having a target frequency fRX. The received signal SRX is supplied to a variable low-pass filter 13 via a high-frequency amplifier 12, where an unwanted signal component distributed in the frequency region higher than the received signal SRX is removed.

The received signal SRX output from the variable low-pass filter 13 is supplied to a pair of mixer circuits 15I and 15Q via a switch circuit 14 connected in the manner shown in FIG. 1 under control of the microcomputer 101 when long- and medium-wave band signals are received.

An oscillation signal SVCO having a predetermined frequency fVCO is obtained from a VCO in a PLL 30 (described below in detail). The oscillation signal SVCO is supplied to a variable divider circuit 39, and is divided into a pair of signals SI and SQ each having a frequency fLO of 1/n (n denotes an integer described below) which are 90° out of phase with respect to each other. The signals SI and SQ are supplied as local oscillation signals (frequency fLO) to mixer circuits 15I and 15Q, respectively.

Designated by reference numeral 31 is a resonator circuit of the VCO in the PLL 30, which is formed of a coil and a variable capacitance diode. A control voltage VPLL supplied from the PLL 30 to the resonator circuit 31 is supplied as a channel selection voltage to the antenna tuned circuit 11.

In the mixer circuits 15I and 15Q, the received signal SRX is subjected by the local oscillation signals SI and SQ to frequency conversion into two intermediate frequency signals SIFI and SIFQ which are 90° out of phase with respect to each other, that is, intermediate frequency signals SIFI and SIFQ of the I (in-phase) and Q (quadrature) axes that are orthogonal to each other, respectively. The intermediate frequency fIF of the intermediate frequency signals SIFI and SIFQ is 55 kHz, as discussed above.

The intermediate frequency signals SIFI and SIFQ are supplied to a polyphase filter 16. A detailed description of the polyphase filter 16 is omitted because a polyphase filter is described in detail in, for example, Japanese Patent Application Laid-open No. 2001-77648; however, phase shift is performed in the polyphase filter 16 in such a manner that target signal components contained in the intermediate frequency signals SIFI and SIFQ are in-phase and image components are inverse in phase with respect to each other, and the phase-shifted signals are summed. Thus, an intermediate frequency signal SIF in which the image components are cancelled out and the target signal components remain is obtained from the polyphase filter 16.

The intermediate frequency signal SIF output from the polyphase filter 16 is supplied to a band-pass filter 17 for intermediate-frequency filtration, where an unwanted signal component is removed from the intermediate frequency signal SIF, and the resulting signal is supplied to a demodulator circuit 19 via an amplifier 18. The demodulator circuit 19 is capable of demodulating AM-modulated signals, DSB signals, SSB signals, narrowband FM signals, and the like. In the demodulator circuit 19, an audio signal is demodulated from the intermediate frequency signal SIF. The audio signal is obtained from the IC 10 via a buffer amplifier 29. Thus, long- and medium-wave band receptions are achieved.

For a short-wave band reception, a broadcast wave in the short-wave band (also including signals such as ham signals) is received by the antenna 61, and the received signal is supplied to an antenna tuned circuit 21 which is an electronically tuned circuit via a distributor 62. A received signal SRX having a target frequency fRX is then obtained.

The received signal SRX is supplied to a variable low-pass filter 23 via a high-frequency amplifier 22, where an unwanted signal component distributed in the frequency range higher than the received signal SRX is removed. The received signal SRX output from the variable low-pass filter 23 is supplied to the mixer circuits 15I and 15Q via the switch circuit 14 connected in the reverse manner to the state shown in FIG. 1 under control of the microcomputer 101 when short-wave band signals are received.

An oscillation signal SVCO having a predetermined frequency fVCO is supplied from the VCO in the PLL 30 to the variable divider circuit 39, and is divided into a pair of signals SI and SQ each having the frequency fLO which are 90° out of phase with respect to each other. The signals SI and SQ are supplied as local oscillation signals (frequency fLO) to the mixer circuits 15I and 15Q, respectively.

Thereafter, processing similar to the processing for the long- and medium-wave band receptions is performed so as to output an audio signal from the demodulator circuit 19 to obtain the audio signal from the IC 10. Thus, a short-wave band reception is achieved.

For an FM broadcast band reception, a broadcast wave in the FM broadcast band is received by the antenna 61, and the received signal is supplied to an antenna tuned circuit 41 which is an electronically tuned circuit via the distributor 62. A received signal SRX having a target frequency fRX is then obtained. The received signal SRX is supplied to a pair of mixer circuits 45I and 45Q via a high-frequency amplifier 42 and an inter-stage tuned circuit 43 having a variable capacitance diode.

An oscillation signal SVCO having a predetermined frequency fVCO is obtained from a VCO in a PLL 50. The oscillation signal SVCO is supplied to a divider circuit 59, and is divided into a pair of signals SI and SQ each having a quarter frequency fLO which are 90° out of phase with respect to each other. The signals SI and SQ are supplied as local oscillation signals (frequency fLO) to the mixer circuits 45I and 45Q, respectively.

Designated by reference numeral 51 is a resonator circuit of the VCO in the PLL 50, which is formed of a coil and a variable capacitance diode. A control voltage VPLL supplied from the PLL 50 to the resonator circuit 51 is supplied as a channel selection voltage to the antenna tuned circuit 41.

In the mixer circuits 45I and 45Q, the received signal SRX is subjected by the local oscillation signals SI and SQ to frequency conversion into two intermediate frequency signals SIFI and SIFQ which are 90° out of phase with respect to each other, that is, intermediate frequency signals SIFI and SIFQ of the I and Q axes that are orthogonal to each other. The intermediate frequency fIF of the intermediate frequency signals SIFI and SIFQ is 200 kHz, as discussed above.

The intermediate frequency signals SIFI and SIFQ are supplied to a polyphase filter 46, where, for example, phase shift is performed in such a manner that target signal components contained in the intermediate frequency signals SIFI and SIFQ are in-phase and image components are inverse in phase with respect to each other, and the phase-shifted signals are summed. Thus, an intermediate frequency signal SIF in which the image components are cancelled out and the target signal components remain is obtained from the polyphase filter 46.

The intermediate frequency signal SIF output from the polyphase filter 46 is supplied to a band-pass filter 47 for intermediate-frequency filtration, where an unwanted signal component is removed from the intermediate frequency signal SIF, and the resulting signal is supplied to a demodulator circuit 49 via an amplifier 48 to demodulate an audio signal. The audio signal is obtained from the IC 10 via the buffer amplifier 29. An FM broadcast band reception is thus achieved.

2. Specific Example of Antenna Tuned Circuit and PLL

Figure 2:
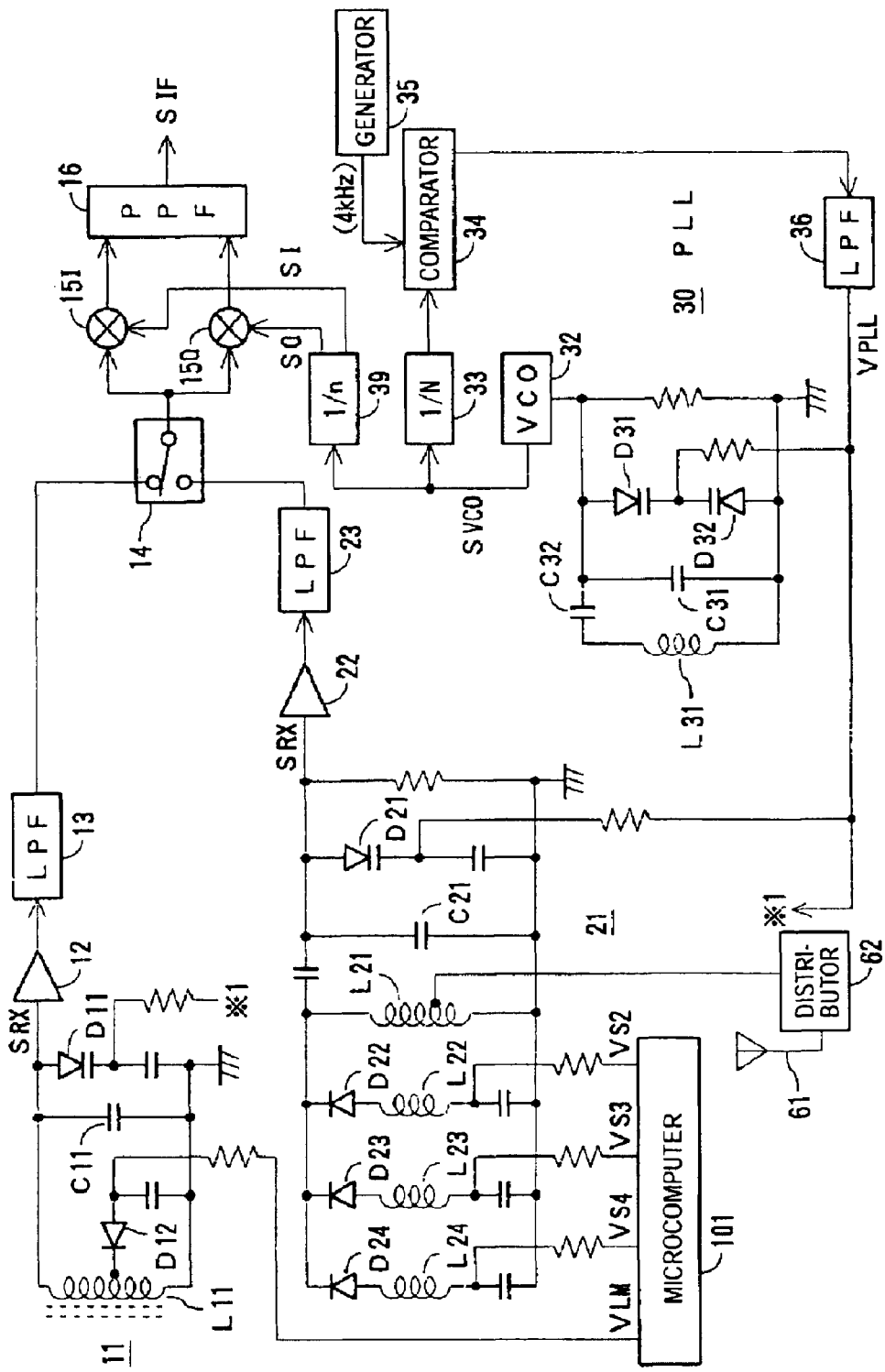
FIG. 2 is a schematic diagram showing one form of a portion of the circuit shown in FIG. 1.

FIG. 2 shows a specific example of the long- and medium-wave band antenna tuned circuit 11, the short-wave band antenna tuned circuit 21, and the PLL 30. Specifically, in the antenna tuned circuit 11, a bar antenna coil L11, a capacitor C11, and a variable capacitance diode D11 are connected in parallel to each other in a high-frequency manner, and a switching diode D12 is connected in parallel to a portion of the coil L11 in a high-frequency manner. A band-switching voltage VLM is supplied from the microcomputer 101 to the diode D12.

In the antenna tuned circuit 21, coils L22 to L24 are connected in parallel to a coil L21 via switching diodes D22 to D24 in a high-frequency manner. A capacitor C21 and a variable capacitance diode D21 are also connected in parallel to the coil L21 in a high-frequency manner. Band-switching voltages VS2 to VS4 are supplied from the microcomputer 101 to the diodes D22 to D24. A broadcast wave signal received by the antenna 61 is supplied to a tap of the coil L21 via the distributor 62.

In the resonator circuit of FIG. 2, a capacitor C31 and a series circuit of variable capacitance diodes D31 and D32 are connected in parallel to a coil L31 via a padding capacitor C32 in a high-frequency manner. The resonator circuit 31 is connected with the VCO 32. The variable capacitance diodes D11, D21, D31, and D32 have the same property.

The PLL 30 is configured in the following manner: an oscillation signal SVCO of the VCO 32 is supplied to the variable divider circuit 33, and is divided into frequencies of 1/N; and the divided signal is supplied to a phase comparator circuit 34 while an alternating signal having a reference stable frequency, for example, 4 kHz, which is obtained from a reference signal generating circuit 35, is also supplied to the comparator circuit 34. The comparison output of the comparator circuit 34 is supplied to a low-pass filter 36 to obtain a DC voltage VPLL whose level changes depending upon the phase difference between the two signals supplied to the comparator circuit 34. The voltage VPLL is supplied to the variable capacitance diodes D31 and D32 in the resonator circuit 31 as a control voltage thereof.

The voltage VPLL is also supplied to the variable capacitance diode D11 in the tuned circuit 11 and the variable capacitance diode D21 in the tuned circuit 21 as a control voltage thereof. As discussed above, the oscillation signal SVCO of the VCO 32 is supplied to the variable divider circuit 39, and is divided into signals SI and SQ each having a frequency of 1/n which are 90° out of phase with respect to each other. The signals SI and SQ are supplied to the mixer circuits 15I and 15Q, respectively.

The PLL 50 is configured in a similar way to the PLL 30. In the PLL 50, however, the reference frequency of the alternating signal output from a generating circuit corresponding to the generating circuit 35 is, for example, 50 kHz.

When a long-wave band signal is received, the diode D12 is turned off in response to the band-switching voltage VLM from the microcomputer 101 to increase the inductance of the coil L11. As a result, the tuned circuit 11 supports reception of the long-wave band signal. The capacitance of the variable capacitance diode D11 changes according to the voltage VPLL from the PLL 30, thus allowing the tuning frequency fTN of the tuned circuit 11 to change according to the local oscillation signal fLO. Thus, the long-wave band signal can be received.

When a medium-wave band signal is received, the diode D12 is turned on in response to the band-switching voltage VLM to decrease the inductance of the coil L11. As a result, the tuned circuit 11 supports reception of the medium-wave band signal. The capacitance of the variable capacitance diode D11 changes according to the voltage VPLL from the PLL 30, thus allowing the tuning frequency fTN of the tuned circuit 11 to change according to the local oscillation signal fLO. Thus, the medium-wave band signal can be received. In this case, the padding capacitor C32 is adjusted so as to minimize the tracking error in the medium wave band.

When a signal in short-wave band 1 is received, the diodes D22 to D24 are turned off in response to the band-switching voltages VS2 to VS4, so that only the coil L21 is used for antenna tuning. The capacitance of the variable capacitance diode D21 changes according to the voltage VPLL from the PLL 30. Thus, the tuning frequency fTN of the tuned circuit 21 changes according to the local oscillation signal fLO, thus allowing reception of the signal in the short-wave band 1.

When a signal in short-wave band 2 is received, the diode D22 is turned on and the diodes D23 and D24 are turned off in response to the band-switching voltages VS2 to VS4, so that the coil L22 is connected in parallel to the coil L21, which are used for antenna tuning. The capacitance of the variable capacitance diode D21 changes according to the voltage VPLL from the PLL 30. Thus, the tuning frequency fTN of the tuned circuit 21 changes according to the local oscillation signal fLO, thus allowing reception of the signal in the short-wave band 2.

When a signal in short-wave band 3 or short-wave band 4 is received, the diode D23 or D24 is turned on and the remaining diodes are turned off in response to the band-switching voltages VS2 to VS4, so that the coil L23 or L24 is connected in parallel to the coil L21, which are used for antenna tuning. The capacitance of the variable capacitance diode D21 changes according to the voltage VPLL from the PLL 30. Thus, the tuning frequency fTN of the tuned circuit 21 changes according to the local oscillation signal fLO, thus allowing reception of the signal in the short-wave band 3 or the short-wave band 4.

3. Frequencies of the Signals

In the receiver shown in FIG. 1, the range of the reception frequency fRX and the frequency step in each of the frequency bands are shown in FIG. 3. In order to achieve the frequencies shown in FIG. 3, the division ratio N of the variable divider circuit 33 and the division ratio n of the variable divider circuit 39 in the PLL 30 are controlled by the microcomputer 101 as shown in FIG. 3.

Specifically, in FIG. 2, in a normal state, the frequency of the output signal of the variable divider circuit 33 is equal to the frequency of the reference signal output from the generating circuit 35, i.e., 4 kHz, and the oscillation frequency fVCO of the VCO 32 is then given by the following expression:

$$fVCO = 4 \times N \text{ [kHz]} \quad (3)$$

Then, the frequency (local oscillation frequency) fLO of the output signals SI and SQ of the variable divider circuit 39 is given by the following expression:

$$fLO = fVCO/n \quad (4)$$
$$= 4 \times N/n \text{ [kHz]}$$

In the long-wave band, any of the frequencies of 150 kHz and 520 kHz, and any of 9-kHz-step frequencies ranging from 153 kHz to 513 kHz is the reception frequency fRX. For this, values shown in FIG. 3 are set in the division ratios N and n.

Specifically, if the reception frequency fRX is desired to be 150 kHz, N=9225 and n=180 are set. Then, as also shown in FIG. 3, the oscillation frequency fVCO is given from equation (3) as follows:

$$fVCO = 4 \times 9225$$
$$= 36900 \text{ [kHz]}$$

The local oscillation signal fLO is given from equation (4) as follows:

$$fLO = 4 \times 9225/180$$
$$= 205 \text{ [kHz]}$$

Therefore, the reception frequency fRX defined by the local oscillation frequency fLO is given from equation (1) as follows:

$$fRX = fLO - fIF$$
$$= 205 - 55$$
$$= 150 \text{ [kHz]}$$

The target reception frequency of 150 kHz is therefore achieved.

Likewise, if the reception frequency fRX is desired to be 153 kHz, N=9360 and n=180 are set. Then, $$fVCO = 4 \times 9360$$
$$= 37440 \text{ [kHz]}$$
$$fLO = 4 \times 9360/180$$
$$= 208 \text{ [kHz]}$$
$$fRX = 208 - 55$$
$$= 153 \text{ [kHz]}$$

The target reception frequency of 153 kHz is therefore achieved.

If the reception frequency is desired to be 162 kHz, N=9873 and n=182 are set.

Then, $$fVCO = 4 \times 9873$$
$$= 39492 \text{ [kHz]}$$

$$fLO = 4 \times 9873/182$$
$$\cong 216.989 \text{ [kHz]}$$

Since the target reception frequency fRX is 162 kHz, the local oscillation frequency fLO should be given from equation (1) as follows:

$$fLO = 162 + 55$$
$$= 217 \text{ [kHz]}$$

The local oscillation frequency fLO has an error given by the following expression:

$$216.989 - 217 = -0.011 \text{ [kHz]}$$
$$= -11 \text{ [Hz]}$$

However, such an error is much smaller than the intermediate frequency of 55 kHz, and is therefore negligible because the reception has no problem due to the error. Thus, there is no problem with the above-described division ratios N=9873 and n=182.

The same holds true for any other reception frequency fRX, and the division ratios N and n monotonically increase as the reception frequency fRX increases, thus making it possible to receive signals in the long-wave band ranging from 150 kHz to 520 kHz every 9 kHz step.

In the medium-wave band, any of 9-kHz-step frequencies ranging between 522 kHz and 1800 kHz is the reception frequency fRX. For this, values shown in FIG. 3 are set in the division ratios N and n.

Specifically, for reception of medium-wave band signals, the division ratio N changes in a range between 9232 and 29680 every 144 steps, while n is fixed to 64. Then, the local oscillation frequency fLO when N=9232 is given from equation (4) as follows:

$$fLO = 4 \times 9232/64$$
$$= 577 \text{ [kHz]}$$

Then, from equation (1), $$fRX = fLO - fIF$$
$$= 577 - 55$$
$$= 522 \text{ [kHz]}$$

The reception frequency is therefore 522 kHz.

The local oscillation frequency fLO when N=29680 is given from equation (4) as follows:

$$fLO = 4 \times 29680/64 = 1855 \text{[kHz]}$$

Then, from equation (1), $$fRX = 1855 - 55 = 1800 \text{[kHz]}$$

The reception frequency is therefore 1800 kHz.

If the amount of change $\Delta fLO$ of the local oscillation frequency fLO with respect to the amount of change $\Delta N$ of the division ratio N is given from equation (4) as the following expression:

$$\Delta fLO = 4 \times \Delta N/n \quad (5)$$

When the division ratio N changes every 144 steps, then, from equation (5), $$\Delta fLO = 4 \times 144/64 = 9 \text{[kHz]}$$

The local oscillation frequency fLO therefore changes every 9-kHz step.

Accordingly, n=64 is set and N changes in a range of 9232 to 29680 every 144 steps, thus making it possible to receive signals in the medium-wave band of 522 kHz to 1800 kHz every 9-kHz step.

In the medium-wave band, the range in which the oscillation frequency fVCO of the VCO 32 changes is determined from equation (3) as follows:

$$fVCO = 4 \times 9232 \text{[kHz]} \text{ to } 4 \times 29680 \text{[kHz]}$$
$$= 36.928 \text{[MHz]} \text{ to } 118.72 \text{[MHz]}$$

For reception of frequency band signals in the short-wave bands 1 to 4, when values shown in FIG. 3 are set in the division ratios N and n, the oscillation frequency fVCO of the VCO 32 and the local oscillation frequency fLO change in the range shown in FIG. 3. Therefore, signals in the short-wave band ranging from 1.8 MHz to 30 MHz can be received every 1-kHz step. The oscillation frequency fVCO of the VCO 32 also changes in the range shown in FIG. 3.

For reception of FM broadcast band signals, the reference frequency of the PLL 50 is 50 kHz. As shown in FIG. 3, the division ratio N of the variable divider circuit in the PLL 50 changes one by one in a range of 1524 to 2164. Thus, the oscillation frequency fVCO of the VCO in the PLL 50 changes in a range of 304.8 MHz to 432.8 MHz every 50-kHz step.

Therefore, the local oscillation frequency fLO of the divided signals (local oscillation signals) SI and SQ output from the divider circuit 59 changes every 50-kHz step in a range between 76.2 MHz and 108.2 MHz according to the division ratio N. Thus, signals in the FM broadcast band of 76 MHz to 108 MHz can be received every 50-kHz step.

4. Summary

For receiving broadcasts, as given by equation (4), the local oscillation frequency fLO is defined by a combination of the two division ratios N and n. If the local oscillation frequency fLO has the same value, the oscillation frequency fVCO of the VCO 32 can be changed by changing the division ratios N and n. When the oscillation frequency fVCO changes, the magnitude of the control voltage VPLL supplied to the VCO 32 varies, and the control voltage VPLL is supplied to the antenna tuned circuit 11 as a tuning voltage thereof.

Accordingly, even if the local oscillation frequency fLO has the same value, the tuning voltage VPLL of the antenna tuned circuit 11 can be changed by changing the division ratios N and n, thereby changing the tuning frequency fTN of the antenna tuned circuit 11. If the padding capacitor C32 is adjusted so as to minimize the tracking error in the medium-wave band as described above, the division ratios N and n are changed in the long-wave band so that the tracking error can be minimized in the long-wave band.

Figure 4:
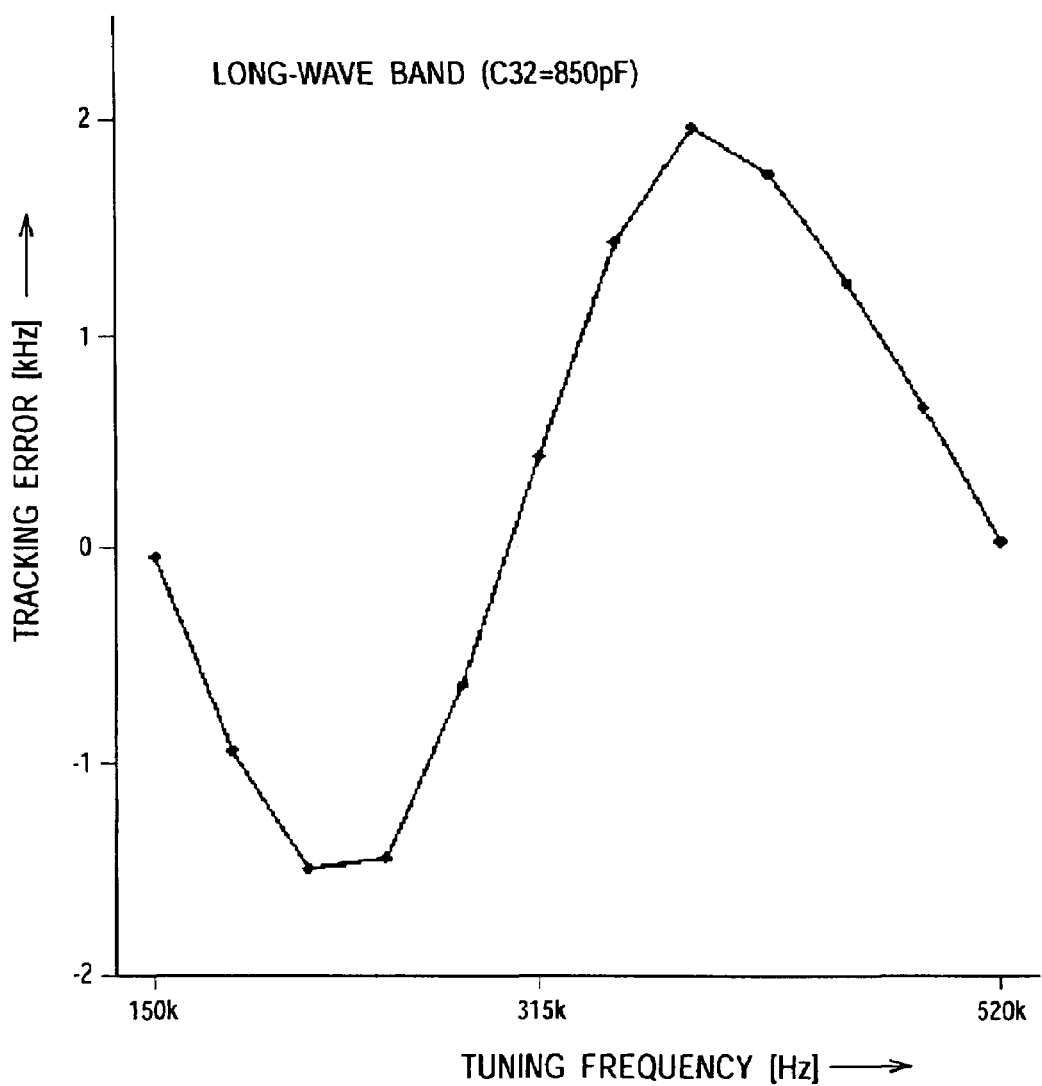
FIG. 4 is a characteristic view showing a tracking error characteristic.
Figure 5:
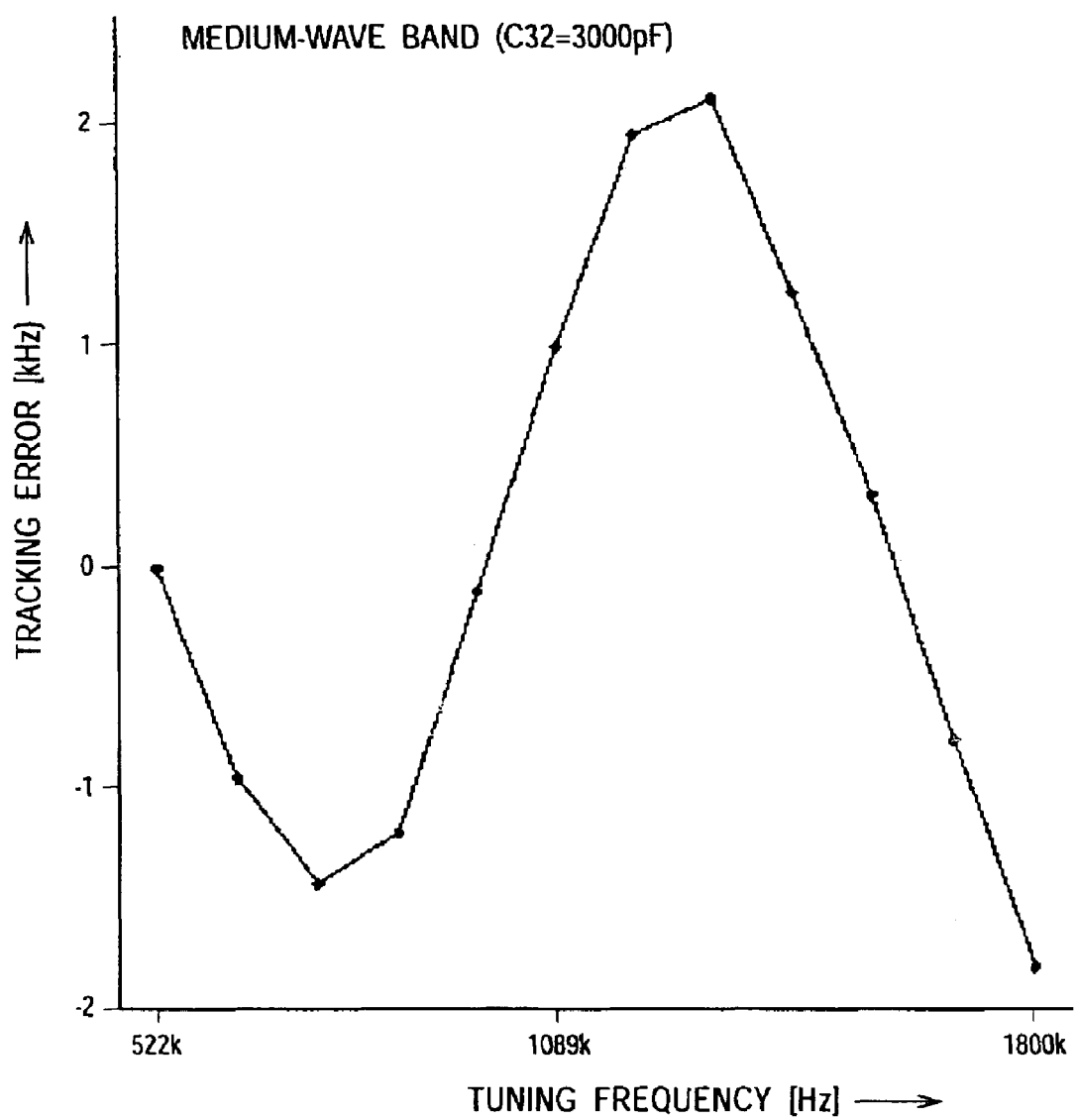
FIG. 5 is a characteristic view showing a tracking error characteristic.
Figure 6:
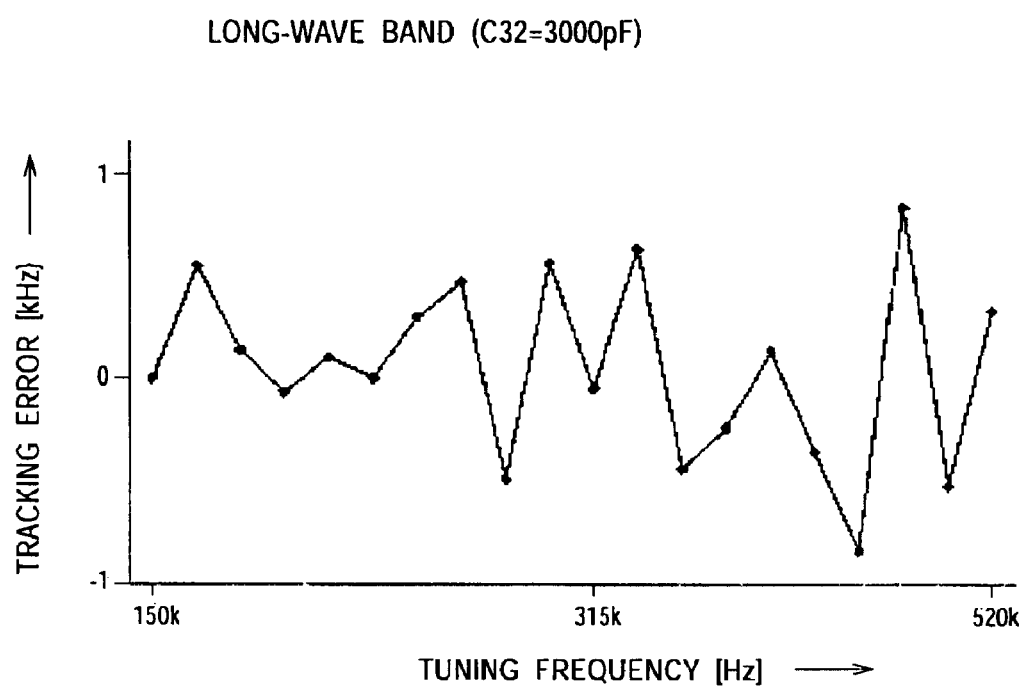
FIG. 6 is a characteristic view showing a tracking error characteristic.

FIGS. 4 to 6 show the result of simulation in which the magnitude of the tracking error in the long-wave band and the medium-wave band was calculated. FIGS. 4 and 5 show the relationship between the tuning frequency fTN and the magnitude of the tracking error, for comparison, if the division ratio n is fixed to 144.

FIG. 4 shows the characteristic in the case where the padding capacitor C32 was adjusted so as to minimize the tracking error in the long-wave band; and FIG. 5 shows the characteristic in the case where the padding capacitor C32 was adjusted so as to minimize the tracking error in the medium-wave band. In the characteristic shown in FIG. 4, C32=850 pF was obtained, and in the characteristic shown in FIG. 5, C32=3000 pF was obtained. As discussed above, there was difference between the capacitances of the padding capacitor C32 which minimizes the tracking error in the long-wave band and the medium-wave band.

FIG. 6 shows the characteristic of the tracking error in the long-wave band according to the present invention. In this case, as also shown in FIG. 5, the capacitance (C32=3000 pF) of the padding capacitor C32 was adjusted so as to minimize the tracking error in the medium-wave band.

In the characteristic shown in FIG. 6, the magnitude of the tracking error rapidly changed depending upon the tuning frequency fTN, although the magnitude was improved compared to the characteristic shown in FIG. 4. That is, even if the tracking error was adjusted in the medium-wave band although the tracking error was not adjusted in the long-wave band, a more desirable tracking error characteristic was achieved than that when the tracking error was adjusted in the long-wave band.

Accordingly, even when the padding capacitor C32 is adjusted so as to minimize the tracking error in the medium-wave band, the tracking error can be minimized in the long-wave band by changing the division ratio n in the long-wave band. Therefore, a high sensitivity receiver is achieved.

As also understood from equation (4), the higher the oscillation frequency fVCO of the VCO 32, the greater the division ratio n. As a result, a change of the local oscillation frequency fLO can be reduced with respect to a change of the division ratio n, thereby reducing the tracking error.

Use of the antenna tuned circuit 11 having less tracking error ensures that a signal having frequencies other than the target reception frequency is rejected, resulting in a desirable interference characteristic. The provision of the antenna tuned circuits 11 and 21 facilitates matching, thus achieving a high sensitivity receiver having high resistance to interference waves. The antenna tuned circuits 11 and 21 would enable the NF to be significantly reduced in the following high-frequency amplifiers 12 and 22 which are formed of a junction transistor having a current amplification factor of about 100. The high-frequency amplifiers 12 and 22 can therefore be mounted on the IC 10 together with the other circuits.

The PLL 30 is common for use in the long-, medium-, and short-wave bands. As also shown in FIG. 3, the range in which the oscillation frequency fVCO of the VCO 32 changes when long- and short-wave band signals are received is substantially covered by the range in which the oscillation frequency fVCO changes when a medium-wave band signal is received, and there is no need for oscillation at a special frequency. A special characteristic or configuration is not required for the resonator circuit 31 or the VCO 32.

Since the oscillation signal SVCO generated by the VCO 32 is divided by the variable divider circuit 39 into frequencies of $1/207$ to $1/4$ (n=207 to 4) to obtain the local oscillation signals SI and SQ, low phase noise is achieved in the local oscillation signals SI and SQ according to the division ratio n. For reception of digital broadcast signals which require phase modulation, a more suitable receiver is achieved.

Since it is not necessary to provide a non-volatile memory for storing tuning data for the antenna tuned circuits 11 and 21, or it is not necessary to determine the data for each receiver and to store the resultant data in a non-volatile memory, the time and labor is not wasted in manufacturing, thus preventing increasing cost.

A single PLL 30 is only required to receive signals in a bandwidth (150 kHz to 30 MHz) which covers from the long-wave band to the short-wave band, and is advantageously incorporated into an IC. All circuits except for the antenna tuned circuits 11 and 21 and the resonator circuit 31 of the PLL 30 can be mounted on the IC 10, thus achieving an inexpensive multi-band receiver having fewer external parts.

Since the oscillation frequency fVCO of the VCO 32 is much higher than the reception bands, the oscillation signal SVCO of the VCO 32, which is received by the antenna 61, can be rejected by the simple low-pass filters 13 and 23, and reception interference is less likely to occur. If spurious interference has been produced in the mixer circuits 15I and 15Q due to the harmonics of the local oscillation signals SI and SQ, a signal component which induced the spurious interference can be rejected by the low-pass filters 13 and 23. The low-pass filters 13 and 23 which are built in the IC 10 would improve characteristics without increasing the number of parts or adjusting procedure steps.

The two PLLs 30 and 50 are required for receiving long-, medium-, and short-wave band signals, and an FM broadcast band signal; however, the two PLLs 30 and 50 would be advantageous in view of the power consumption because, as shown in FIG. 3, the oscillation frequency fVCO of the VCO 32 in the PLL 30 for use in the long-, medium-, and short-wave bands is lower than the oscillation frequency of the VCO in the PLL 50 for use in the FM broadcast band, and because the PLL 50 can be powered off when long-, medium-, and short-wave band signals are received.

Figure 17:
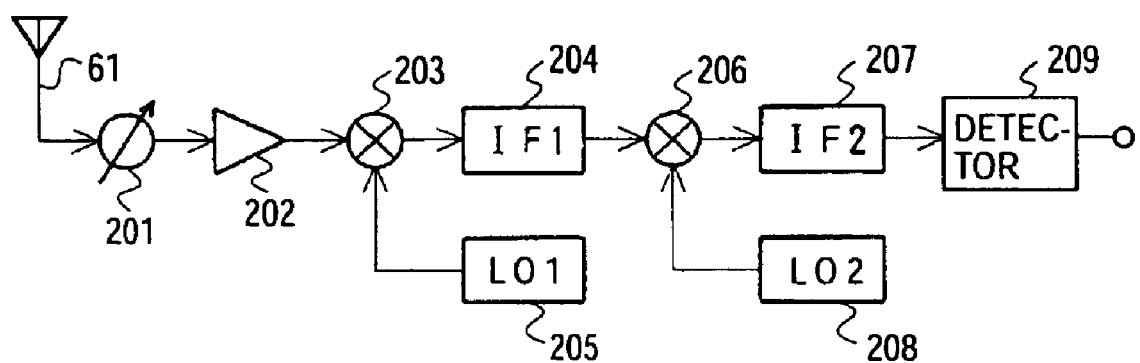
FIG. 17 is a schematic diagram for illustrating the present invention.

Since the frequency of the intermediate frequency signal SIF is low, it is easy to digitally process the intermediate frequency signal SIF and the following signals. Furthermore, since the intermediate frequency fIF is low, the band-pass filter 17 which selects the intermediate frequency signal SIF can be mounted on the IC 10. In addition, a crystal filter required for a double-conversion receiver shown in FIG. 17 is not necessary, thereby reducing the cost.

5. Specific Example of Variable Low-Pass Filter

Figure 7:
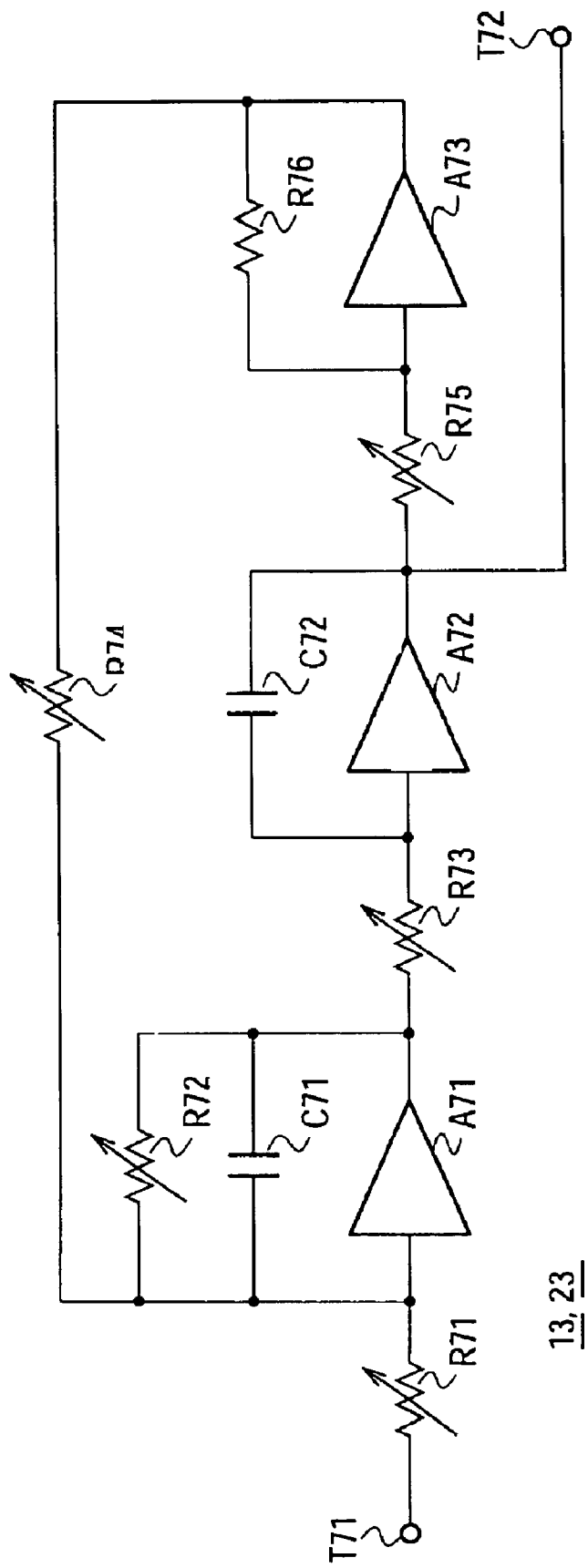
FIG. 7 is a schematic diagram showing one form of a portion of the circuit shown in FIG. 1.

FIG. 7 shows a specific example of the variable low-pass filters 13 and 23. In this example, each of the variable low-pass filters 13 and 23 is a bi-quad filter in which the resistance values are changed to change the cut-off frequency.

Specifically, an input terminal T71 is connected to an inverting input terminal of an operational amplifier A71 via a variable resistor circuit R71 described below, and a parallel circuit of a capacitor C71 and a variable resistor circuit R72 is connected between the output terminal and the inverting input terminal of the operational amplifier A71.

The output terminal of the operational amplifier A71 is connected to an inverting input terminal of an operational amplifier A72 via a variable resistor circuit R73, and the output terminal of the operational amplifier A72 is connected to an output terminal T72. A capacitor C72 is connected between the output terminal and the inverting input terminal of the operational amplifier A72.

The output terminal of the operational amplifier A72 is also connected to an inverting input terminal of an operational amplifier A73 via a resistor R75. A resistor R76 is connected between the output terminal and the inverting input terminal of the operational amplifier A73, and the output terminal of the operational amplifier A73 is connected to the inverting input terminal of the operational amplifier A71 via a variable resistor circuit R74.

As described below, the resistances of the variable resistors R71 to R74 are controlled by the microcomputer 101. Although not shown, non-inverting input terminals of the operational amplifiers A71 to A73 are grounded. For example, C71=C72, R73=R74, and R75=R76.

Such a configuration allows this circuit to function as a secondary low-pass filter, whose cut-off frequency f13, gain AV, and Q factor have the following values:

$$f13 = 1/(2\pi C71 \cdot R73) \text{ [Hz]}$$

$$AV = R73/R71 \text{ [time]}$$

$$Q = R72/R73$$

Therefore, as the resistances of the variable resistors R73 and R74 change, the cut-off frequency f13 also changes. In this case, at the same time, as the resistances of the variable resistors R71 and R72 change, the gain AV and the Q factor does not change even if the cut-off frequency f13 changes.

Figure 8:
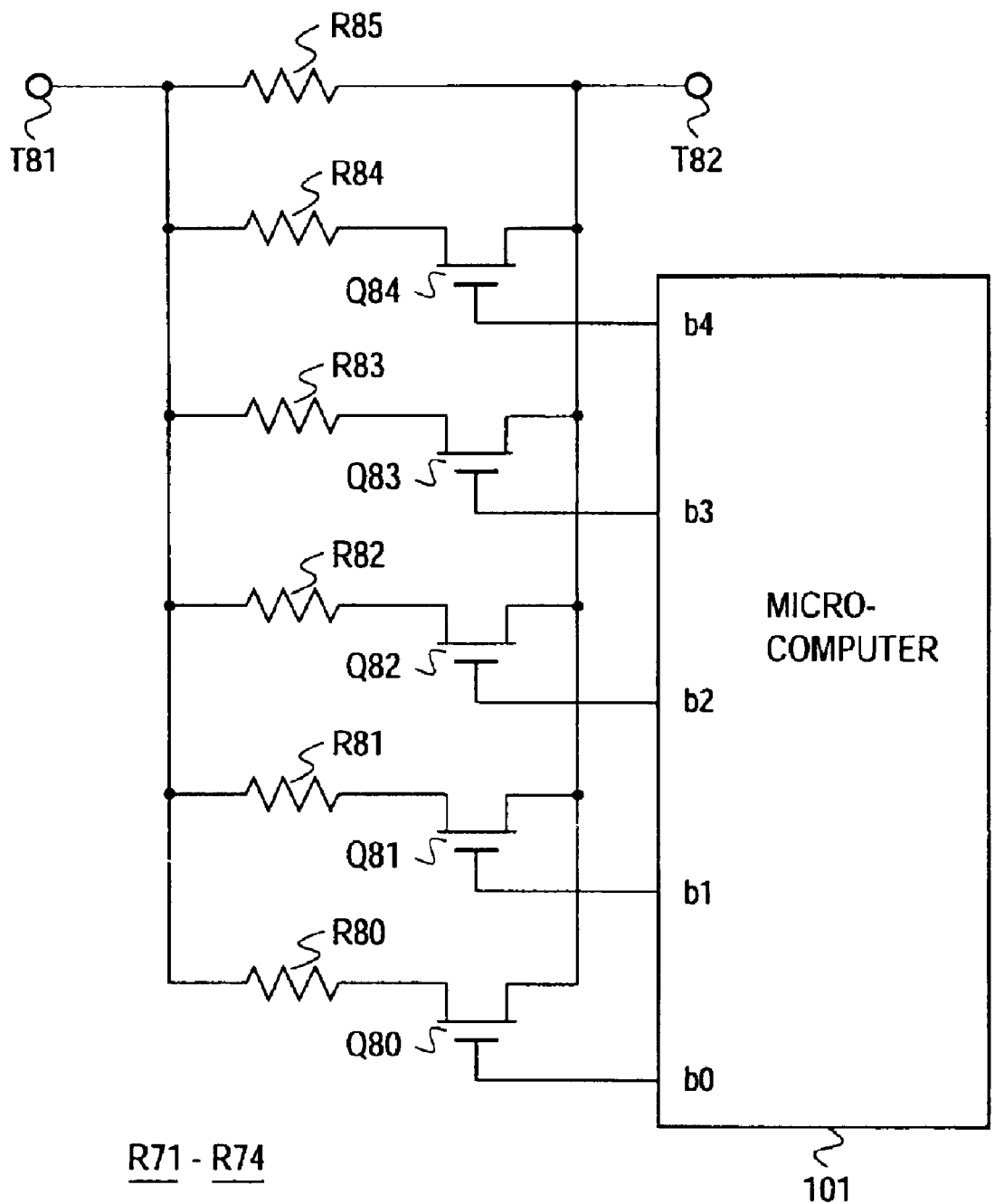
FIG. 8 is a schematic diagram showing one form of a portion of the circuit shown in FIG. 7.

The variable resistor circuits R71 to R74 may be configured in the manner shown in, for example, FIG. 8. Specifically, a resistor R85 is connected between terminals T81 to T82, and series circuits of resistors R84 to R80 and the drain and source of FETs (Q84 to Q80) are also connected between the terminals T81 and T82. Predetermined control data of bits b4 to b0 are supplied to the gates of the FETs (Q84 to Q80) from the microcomputer 101, respectively.

When the variable resistor circuits R71 to R74 are used in the filters 13 and 23 shown in FIG. 7, each of the variable resistor circuits R71 and R73 is connected so that the terminals T81 and T82 are positioned at the previous and following stages, respectively, and each of the variable resistor circuits R72 and R74 is connected so that the terminals T81 and T82 are positioned at the following and previous stages, respectively. That is, each of the variable resistor circuits R71 to R74 is connected so that the terminal T81 is an input terminal and the terminal T82 is an output terminal with respective to a signal flow.

When a predetermined resistance is designated as value R, the resistances of the resistors R85 to R80 are expressed as follows according to the weighting of bits b4 to b0: R85=5/2·R, R84=5/3·R, R83=10/3·R, R82=20/3·R, R81=40/3·R, and R80=80/3·R.

The gate widths W24 to W20 of the FETs (Q84 to Q80) are expressed as follows, by way of example, according to the weighting of bits b5 to b0: W24=24 μm, W23=16 μm, W22=8 μm, W21=4 μm, and W20=2 μm.

With this configuration, when any of bits b4 to b0 is set to "1" or "0", the corresponding FET of the FETs (Q84 to Q80) is turned on or off, and some of the resistors R84 to R80 is connected in parallel to the resistor R85 which corresponds to the FET (Q84 to Q80) turned on or off.

The resistance R70 between the terminals T81 and T82 is expressed as follows:

$$R70 = 80/(32+3\text{ m}) \cdot R$$

where m denotes a value ranging from 0 to 31 as designated by bits b4 to b0. Then, the resistance R70 changes in a range between 2.5 R and 0.64 R every 32 steps. This circuit can therefore be used for the variable resistors R71 to R74.

② Second Receiver

1. Configuration and Operation of the Receiver

Figure 9:
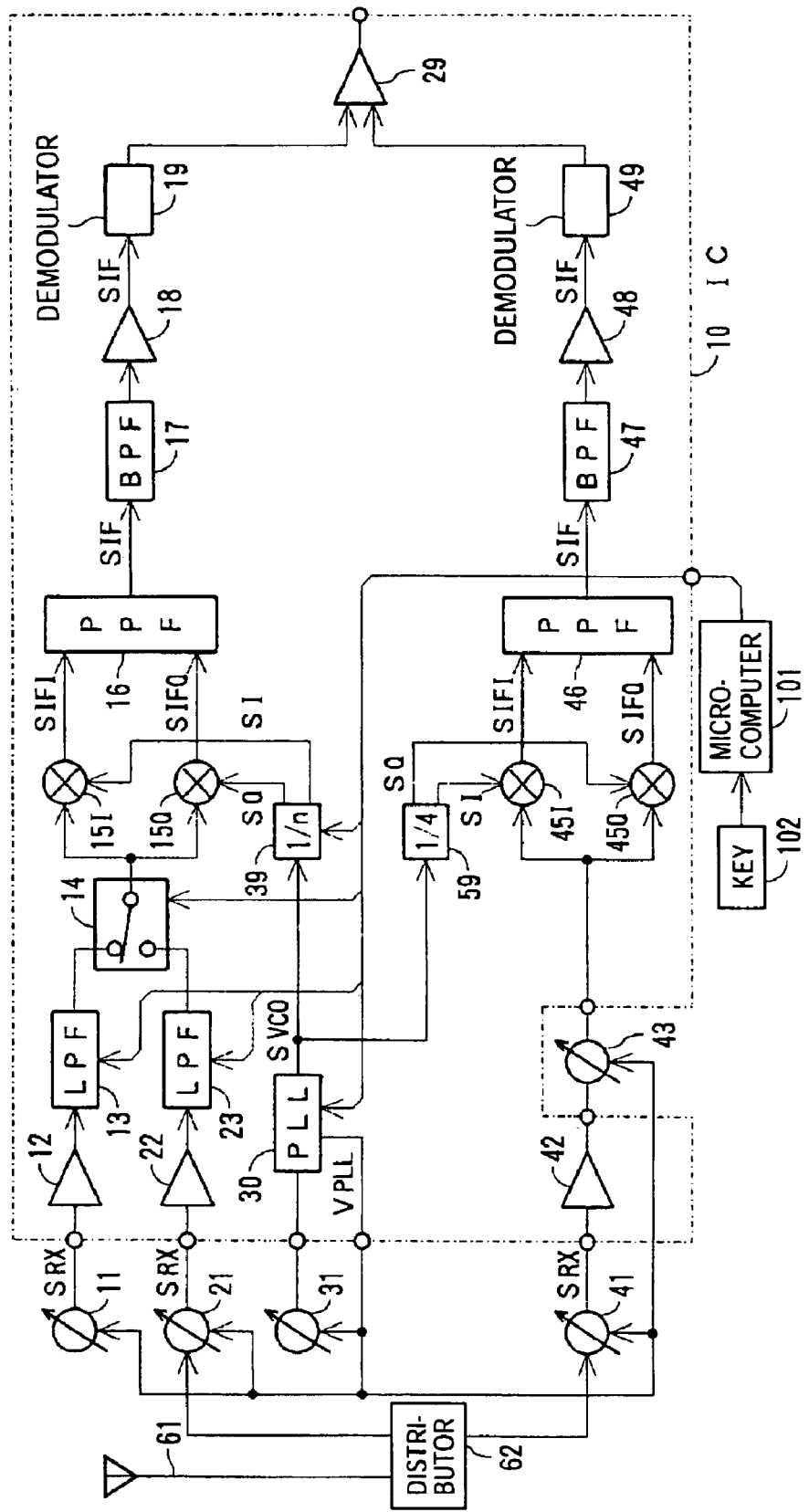
FIG. 9 is a schematic diagram showing another embodiment of the present invention.

The above-described receiver is provided with the PLL 30 for receiving long-, medium-, and short-wave band signals, and the PLL 50 for receiving an FM broadcast band signal. The PLLs 30 and 50 may be commonly used. FIG. 9 shows an example of a receiver having such a configuration in which the oscillation frequency of a VCO in the PLL changes in a smaller range.

Figure 10:
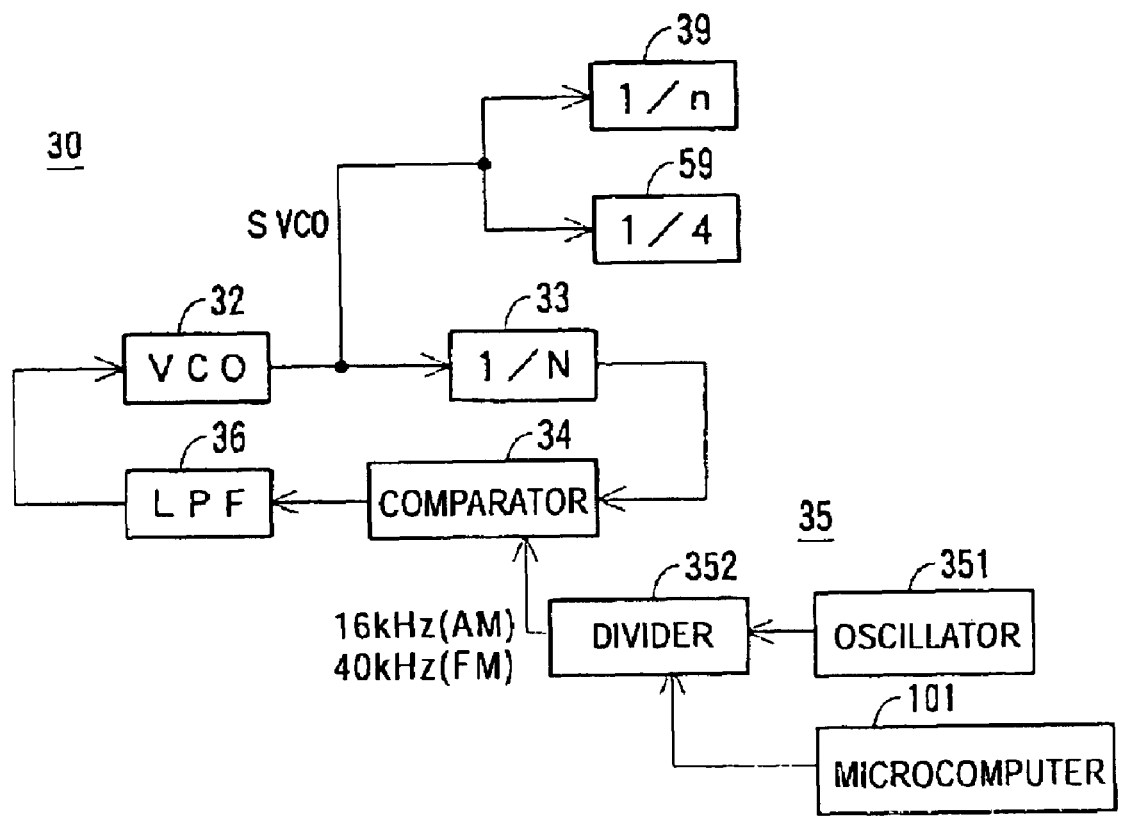
FIG. 10 is a schematic diagram showing one form of a portion of the circuit shown in FIG. 9.

Specifically, the PLL 50 in the receiver shown in FIG. 1 is eliminated from the receiver shown in FIG. 9. As also shown in FIG. 10, an oscillation signal SVCO output from the VCO 32 is supplied to the variable divider circuit 39, and is also supplied to the divider circuit 59. The generating circuit 35 is formed of, for example, a crystal oscillator circuit 351 and a variable divider circuit 352 for dividing the oscillation signal of the crystal oscillator circuit 351.

The division ratio of the variable divider circuit 352 is controlled by the microcomputer 101. A divided signal having a frequency of 16 kHz is obtained from the variable divider circuit 352 when long-, medium-, and short-wave band signals are received, and a divided signal having a frequency of 55 kHz is obtained when an FM broadcast band signal is received, and the divided signals are supplied as reference signals to the phase comparator circuit 34, the output of which is supplied to the low pass filter (LPF) 36. It is assumed that the intermediate frequency fIF for reception of long-, medium-, and short-wave band signals is 55 kHz, and the intermediate frequency fIF for reception of FM broadcast band signals is 200 kHz.

2. Frequencies of the Signals

In this receiver, the division ratios N and n of the variable divider circuits 33 and 39 are controlled by the microcomputer 101 so as to have values shown in, for example, FIG. 11 according to the reception band and the reception frequency fRX.

Then, for reception of long-, medium-, and short-wave band signals, similarly to equations (3) and (4):

$$fVCO = 16 \times N \text{ [kHz]} \qquad (6)$$

$$fLO = 16 \times N/n \text{ [kHz]} \qquad (7)$$

If N=14248 and n=1112 are set, then, as also shown in FIG. 11, the following values are obtained:

$$fVCO = 227968 \text{ [kHz]}$$

$$fLO = 205.007 \text{ [kHz]}$$

The reception frequency fRX is 150 kHz from equation (1).

By monotonically decreasing the division ratios N and n as the reception frequency fRX increases in the long- and medium-wave bands, long- and medium-wave band signals can be received every 9-kHz step.

For reception of FM broadcast band signals, likewise, $$fVCO = 40 \times N \text{ [kHz]} \tag{8}$$

$$fLO = 40 \times N/n \text{ [kHz]} \tag{9}$$

For example, if N=7620 and n=4 are set, then, as also shown in FIG. 11, the following values are obtained:

fVCO=304800 [kHz]

fLO=76200 [kHz]

The reception frequency fRX is 76 MHz from equation (1).

In this way, the oscillation frequency fVCO of the VCO 32 and the local oscillation frequency fLO change in the manner shown in FIG. 11 depending upon the division ratios N and n. Therefore, the target frequency fRX is obtained in each reception band.

3. Summary

As discussed above, even if the local oscillation frequency fLO has the same value, the tuning voltage VPLL of the antenna tuned circuit 11 can be changed by changing the division ratios N and n, thereby changing the tuning frequency fTN of the antenna tuned circuit 11. Thus, if the padding capacitor C32 is adjusted so as to minimize the tracking error in the short-wave band, the division ratios N and n are changed in the long- and medium-wave bands so as to minimize the tracking error in the long- and medium-wave bands.

Figure 12:
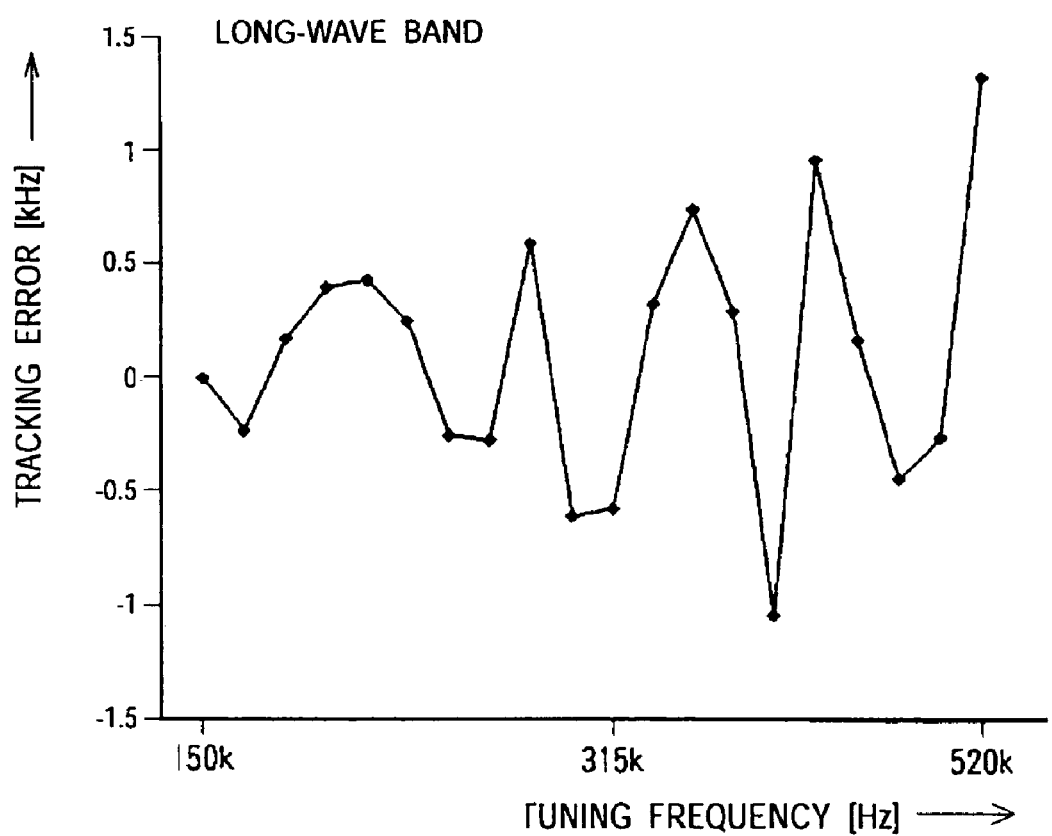
FIG. 12 is a characteristic view showing a tracking error characteristic.
Figure 13:
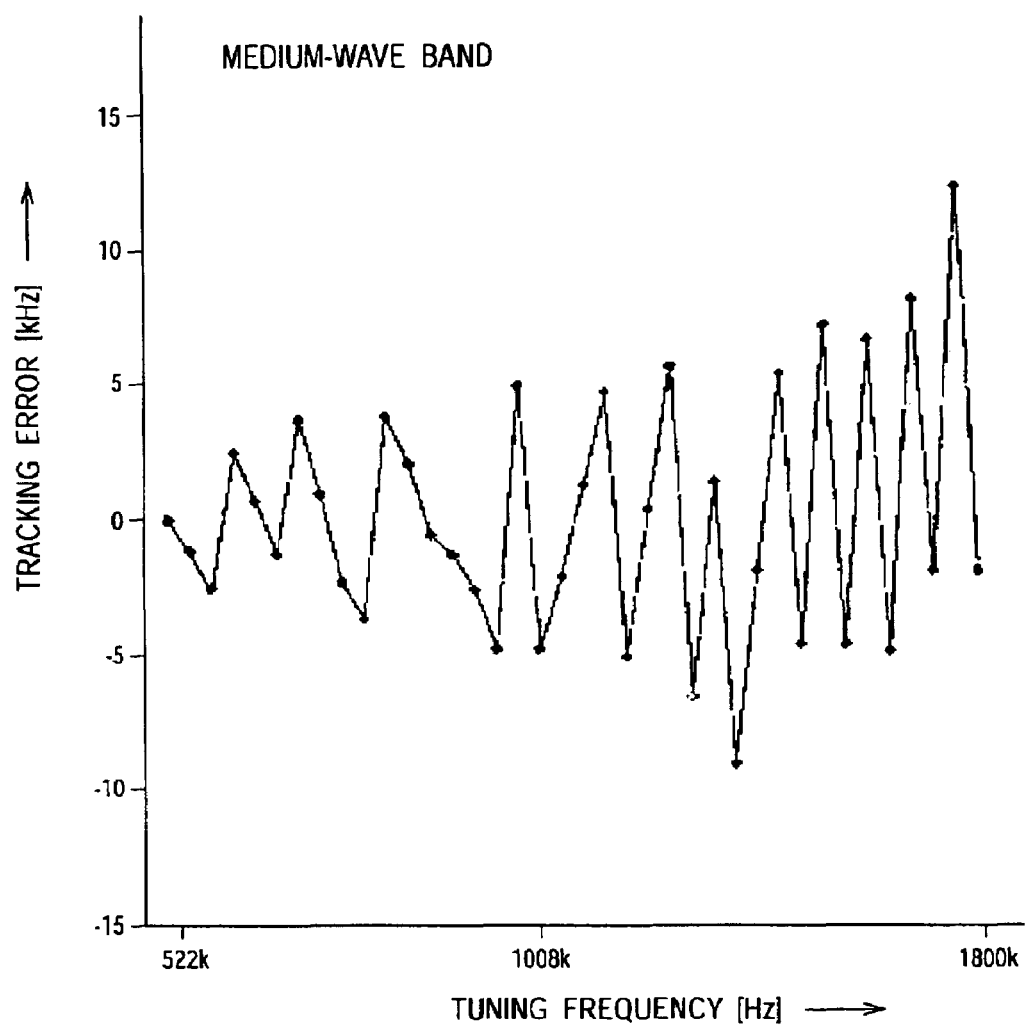
FIG. 13 is a characteristic view showing a tracking error characteristic.
Figure 14:
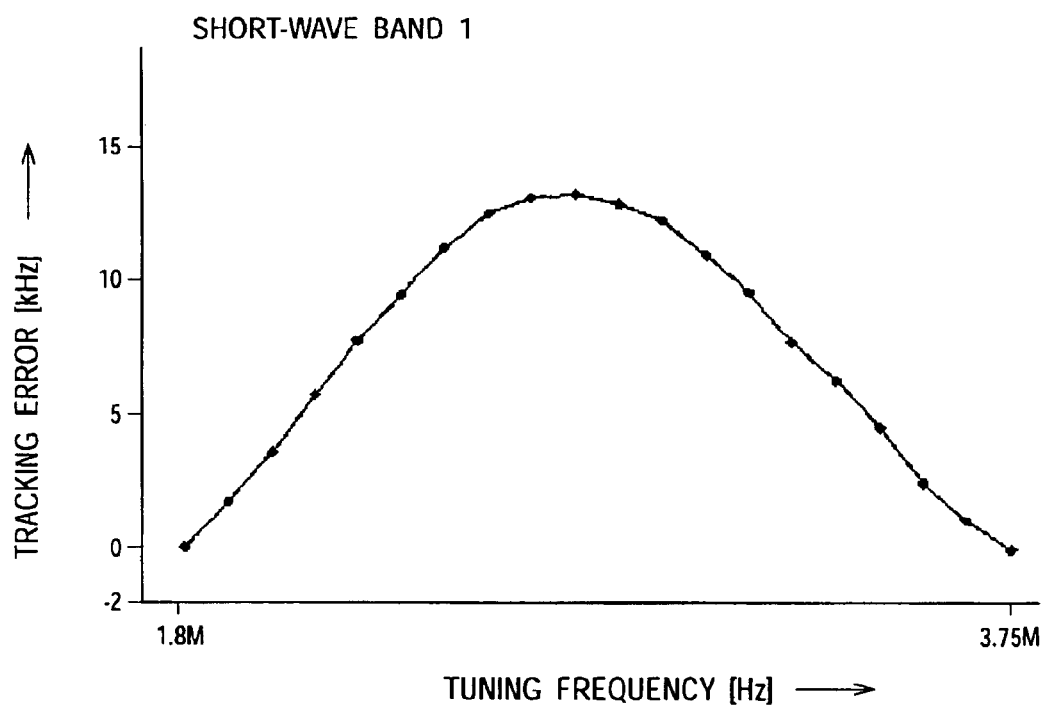
FIG. 14 is a characteristic view showing a tracking error characteristic.
Figure 15:
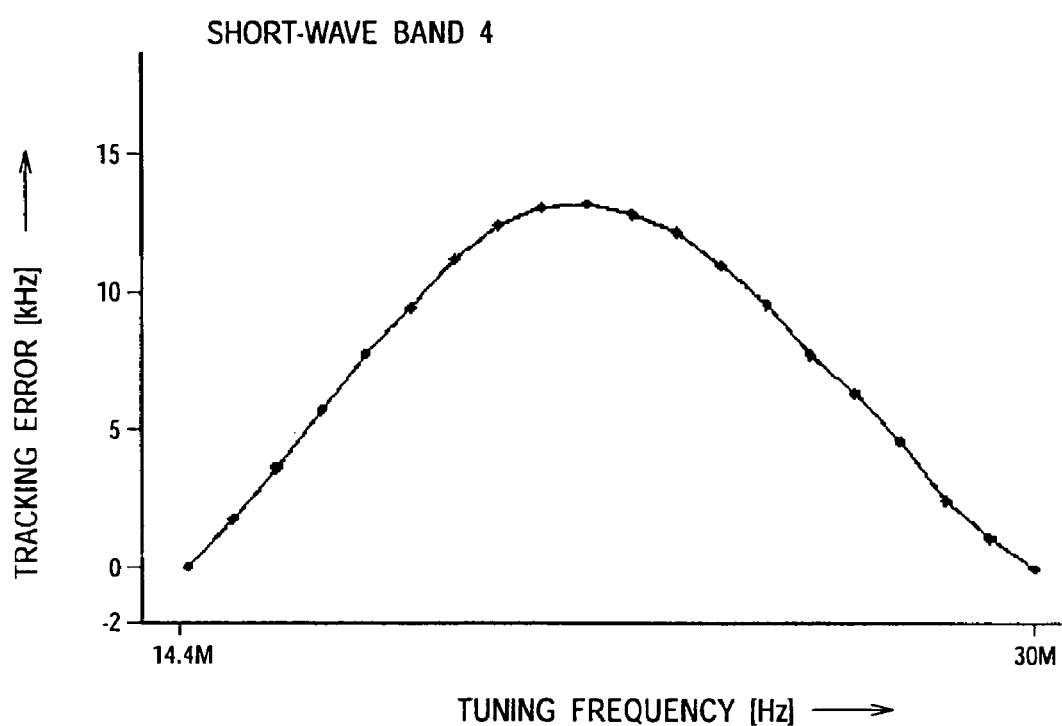
FIG. 15 is a characteristic view showing a tracking error characteristic.

FIGS. 12 to 15 show the result of simulation in which the magnitude of the tracking error in the long-, medium-, and short-wave bands was calculated. FIGS. 14 and 15 show the characteristic in the case where the padding capacitor C32 was adjusted so as to minimize the tracking error in short-wave band 1 (1.8 MHz to 3.75 MHz) and short-wave band 4 (14.4 MHz to 30 MHz), respectively.

FIGS. 12 and 13 show the characteristic of the tracking error in the long- and medium-wave bands, respectively, when tracking adjustment was performed in the short-wave band 1 and the short-wave band 4. The characteristic shows that a sufficient tracking characteristic is exhibited in the long- and medium-wave bands if the tracking error is adjusted in the short-wave band although the tracking error is not adjusted in the long- and medium-wave bands.

In this way, even when the padding capacitor C32 is adjusted so as to minimize the tracking error in the short-wave band, the tracking error can be minimized in the long- and medium-wave bands by changing the division ratios N and n in the long- and medium-wave bands. Therefore, a receiver which provides high sensitivity in all bands is achieved.

The high-low ratio (the ratio of the maximum frequency to the minimum frequency) of the oscillation frequency fVCO of the VCO 32 in each of the short-wave bands is approximately two, while the high-low ratio of the reception frequency in each of the long-wave band and the medium-wave band is three or more. However, the division ratios N and n are changed to allow the high-low ratio of the oscillation frequency fLO of the VCO 32 in each of the long-wave band and the medium-wave band to also become approximately two. Thus, the high-low ratio of the oscillation frequency fLO is approximately two in any reception band, thus achieving a desired tracking characteristic.

Furthermore, a single VCO 32 covers all reception bands. The oscillation frequency fVCO in any reception band ranges from about 230 MHz to 500 MHz, and therefore has a substantially equal frequency range. A single VCO 32 is used to receive signals in a range covering from the long-wave band to the FM broadcast band without difficulty, thus making it possible to reduce the number of parts, thereby achieving a simple multi-band receiver.

③ Third Receiver

1. Configuration and Operation of the Receiver

Figure 16:
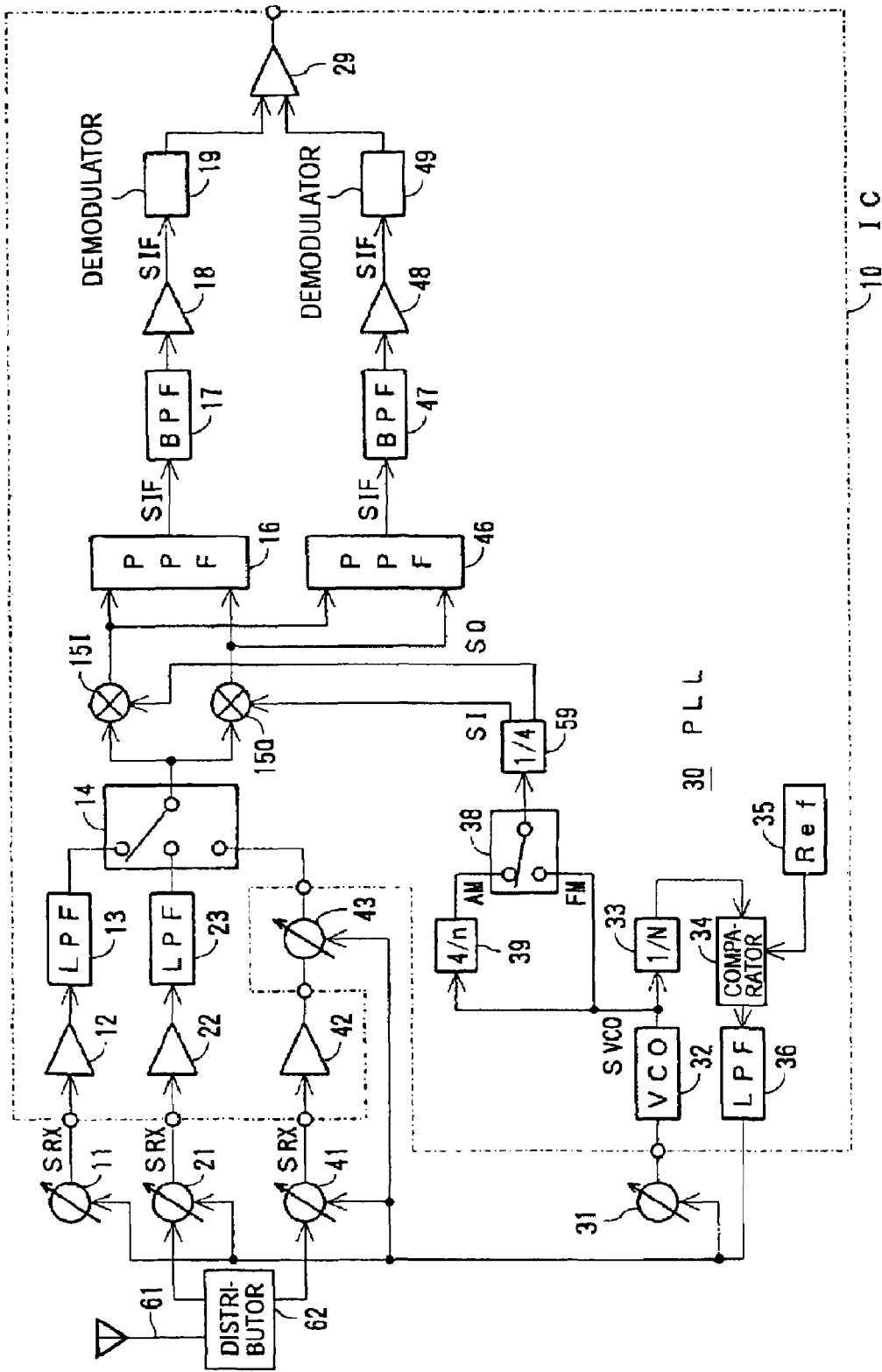
FIG. 16 is a schematic diagram showing another embodiment of the present invention.

In the receiver shown in FIG. 9, a PLL for reception of long-, medium-, and short-wave band signals, and a PLL for reception of an FM broadcast band signal are commonly used. In addition, the mixer circuits 15I and 15Q, and the mixer circuits 41I and 45Q may also be commonly used. An exemplary receiver having such a configuration is shown in FIG. 16.

A received signal SRX in the long- and medium-wave bands output from the low-pass filter 13, a received signal SRX in the short-wave band output from the low-pass filter 23, and a received signal SRX in the FM broadcast band output from the inter-stage tuned circuit 43 are supplied to the band-switching switch circuit 14. The switch circuit 14 is switched by the microcomputer of FIG. 16 to select and obtain the received signal SRX in a target reception band, and the selected received signal SRX is supplied to the mixer circuits 15I and 15Q.

An oscillation signal SVCO (frequency fVCO) of the VCO 32 is supplied to an FM-side contact of the band-switching switch circuit 38. The oscillation signal SVCO is also supplied to a variable divider circuit 39 for division into signals each having a 4/n frequency, and the resulting divided signal is supplied to an AM-side contact of the switch circuit 38. The output signal of the switch circuit 38 is supplied to the divider circuit 59, and is divided into a pair of signals SI and SQ each having a quarter frequency which are 90° out of phase with respect to each other. The signals SI and SQ are supplied as local-oscillation signals (frequency fLO) to the mixer circuits 15I and 15Q, respectively.

The switch circuit 38 is connected to the AM-side contact when long-, medium-, and short-wave band signals are received, and is connected to the FM-side contact when an FM broadcast band signal is received. It is assumed that the intermediate frequency fIF for reception of long-, medium-, and short-wave band signals is 55 kHz, and the intermediate frequency fIF for reception of FM broadcast band signals is 200 kHz.

2. Frequencies of the Signals

In this receiver, again, the division ratios N and n of the variable divider circuits 33 and 39 are controlled by the microcomputer 101 so as to have values shown in, for example, FIG. 11 according to the reception band and the reception frequency fRX.

When long-, medium-, and short-wave band signals are received, the switch circuit 38 is connected to the AM-side contact as shown in FIG. 16, and the oscillation signal SVCO of the VCO 32 is divided into signals SI and SQ by the two divider circuits 39 and 59, which are then supplied to the mixer circuits 15I and 15Q, respectively. The frequency SLO of each of the local oscillation signals SI and SQ is given by the following expression:

$$SLO = (4/n) \times (1/4) \times fVCO = 1/n \times fVCO$$

When an FM broadcast band signal is received, the switch circuit 38 is connected to the FM-side contact in the manner reverse to the state shown in FIG. 16, and the oscillation signal SVCO of the VCO 32 is divided into signals SI and SQ by the divider circuit 59, which are then supplied to the mixer circuits 15I and 15Q, respectively. The frequency SLO of each of the local oscillation signals SI and SQ is given by the following expression:

$$SLO = \tfrac{1}{4} \times fVCO$$

In this receiver, again, the oscillation frequency fVCO of the VCO 32 and the local oscillation frequency fLO change in the manner shown in FIG. 11 depending upon the division ratios N and n. Therefore, the target frequency fRX is obtained in each reception band.

3. Summary

As discussed above, since the polyphase filters 16 and 46 are adapted to cancel out the image components by phase-shifting and computation in order to obtain a target intermediate frequency, the intermediate frequency signals SIFI and SIFQ output from the mixer circuits 15I and 15Q must have an equal level and must be 90° out of phase with respect to each other with precision. In this receiver, a single set of the mixer circuits 15I and 15Q and the divider circuit 59 is only required for generating such intermediate frequency signals SIFI and SIFQ, thus easily maintaining the necessary characteristic and accuracy.

(4) Other Configurations

An AGC circuit or a stereo demodulator circuit may be mounted on the above-described IC 10. In a digital broadcast receiver, it is appropriate that an A/D converter circuit be provided after the polyphase filters 16 and 46 for digitally processing the intermediate frequency signal SIF and the following signals.

[A list of abbreviations used herein]
AM: Amplitude Modulation
D/A: Digital to Analog
DSB: Double Side Band
FET: Field Effect Transistor
FM: Frequency Modulation
IC: Integrated Circuit
NF: Noise Figure
PLL: Phase Locked Loop
SSB: Single Side Band
VCO: Voltage Controlled Oscillator According to the present invention, in a multi-band receiver, if a padding capacitor is adjusted so as to minimize the tracking error in a certain reception band, the tracking error can be minimized in the remaining reception bands by selecting the division ratios N and n. Therefore, a receiver having a high sensitivity in any reception band is achieved.

An antenna tuned circuit having low tracking error is used, resulting in a desired interference characteristic. Furthermore, the provision of an antenna tuned circuit facilitates matching, thus achieving a high sensitivity receiver having high resistance to interference waves. Furthermore, the provision of an antenna tuned circuit enables the NF to be significantly reduced in the following high-frequency amplifier which is formed of a junction transistor, thus making it possible to mount the high-frequency amplifier and the other circuits on an IC.

Since a PLL for local oscillation is commonly used in a plurality of reception bands, in which case the oscillation frequency of a VCO changes in a substantially equal range in any reception band or a range in which the oscillation frequency changes in a certain reception band is covered by a range in which the oscillation frequency changes in the remaining reception bands, a special characteristic or configuration is not required for the VCO or a resonator circuit thereof.

Since the oscillation signal generated by the VCO is divided by a variable divider circuit into frequencies of 1/n to generate a local oscillation signal, low phase noise is achieved in the local oscillation signal according to the division ratio n. For reception of digital broadcast signals which require phase modulation, therefore, a more suitable receiver is achieved. Since it is not necessary to provide a non-volatile memory for storing tuning data for the antenna tuned circuit, or it is not necessary to determine the data for each receiver and to store the resultant data in a non-volatile memory, the time and labor is not wasted in manufacturing, thus preventing increasing cost.

A single PLL is only required to receive signals in a bandwidth (150 kHz to 30 MHz) which covers from the long-wave band to the short-wave band, and is advantageously incorporated into an IC. All circuits except for the antenna tuned circuit and the resonator circuit in the PLL can be mounted on the IC, thus achieving an inexpensive multi-band receiver having fewer external parts. Furthermore, since the oscillation frequency of the VCO is much higher than the frequency of the reception bands, the oscillation signal of the VCO, which is received by an antenna, can be rejected by a simple low-pass filter, and reception interference is less likely to occur.

If spurious interference has been produced in a mixer circuit due to the harmonics of the local oscillation signal, a signal component which induced the spurious interference can be rejected by the low-pass filter. The low-pass filter which is built in the IC would improve characteristics without increasing the number of parts or adjusting procedure steps. Since the frequency of the intermediate frequency signal is low, it is easy to digitally process the intermediate frequency signal and the following signals.

Since the intermediate frequency is low, a band-pass filter for selecting this intermediate frequency signal can be mounted on the IC. In addition, a crystal filter required for a double-conversion receiver is not necessary, thereby reducing the cost. Furthermore, the division ratios N and n are changed to allow the high-low ratio of the oscillation frequency of the VCO of the PLL in any reception band to become approximately two, thus achieving a desired tracking characteristic. The number of parts can also be reduced, thus achieving a simple multi-band receiver.

The invention claimed is:

1. An IC which forms a multi-band superheterodyne receiving circuit comprising:

a PLL;

a first variable divider circuit for dividing an oscillation signal of a VCO forming the PLL by a division ratio n to provide a local oscillation signal; and a mixer circuit for subjecting a received signal to frequency conversion into an intermediate frequency signal by the local oscillation signal, the PLL, the variable divider circuit, and the mixer circuit being formed on one chip, wherein the multi-band receiving circuit is adapted to receive and process a plurality of frequency bands comprising at least a first frequency band and a second frequency band, different from the first frequency band, wherein, to change a reception frequency to a frequency in the first frequency band, the division ratio n of the first variable divider circuit and a division ratio N of a second variable divider circuit forming the PLL are changed, and to change a reception frequency to a frequency in the second frequency band, at least the division ratio N of the second variable divider circuit forming the PLL is changed;

wherein the first frequency band has a first frequency step and the second frequency band having a second frequency step, different from the first frequency step.

2. The IC according to claim 1, wherein the division ratios N and n are selected, at least in part, to reduce a tracking error.

3. An IC which forms a multi-band superheterodyne receiving circuit comprising:

a high-frequency amplifier to which a received signal output from an antenna tuned circuit is supplied;

a filter circuit for selecting the received signal output from an output signal of the high-frequency amplifier;

a pair of mixer circuits for subjecting the received signal selected by the filter circuit to frequency conversion into a pair of intermediate frequency signals by a pair of local oscillation signals;

a processor circuit for phase-shifting and computing the pair of intermediate frequency signals to output a desired intermediate frequency signal component;

a PLL; and a first variable divider circuit having a division ratio n for dividing an oscillation signal of a VCO forming the PLL into a pair of divided signals which have an equal frequency and which are 90° out of phase with respect to each other, the high-frequency amplifier, the filter circuit, the pair of mixer circuits, the processor circuit, the PLL, and the first variable divider circuit being formed on one chip, wherein the multi-band receiving circuit is adapted to receive and process a plurality of frequency bands comprising at least a first frequency band and a second frequency band, different from the first frequency band, wherein a pair of divided signals is supplied as the pair of local oscillation signals to the pair of mixer circuits; and wherein, to change a reception frequency to a frequency in the first frequency band, the division ratio n of the first variable divider circuit and a division ratio N of a second variable divider circuit forming the PLL are changed, and to change a reception frequency to a frequency in the second frequency band, the division ratio N of the second variable divider circuit forming the PLL is changed;

wherein the first frequency band has a first frequency step and the second frequency band having a second frequency step, different from the first frequency step.

4. The IC according to claim 3, wherein the division ratios N and n are selected, at least in part, to reduce a tracking error.

* * * * *